Oct. 13, 1964 F. J. WOOLAM 3,153,202

DIRECT-COUPLED AMPLIFIER

Filed May 12, 1961 2 Sheets-Sheet 1

INVENTOR
FRANK J. WOOLAM
BY A. M. Fernandez
ATTORNEY

Oct. 13, 1964 F. J. WOOLAM 3,153,202

DIRECT-COUPLED AMPLIFIER

Filed May 12, 1961 2 Sheets-Sheet 2

3,153,202

DIRECT-COUPLED AMPLIFIER

Frank J. Woolam, Mesa, Ariz., assignor to General Electric Company, a corporation of New York Filed May 12, 1961, Ser. No. 109,605
7 Claims. (Cl. 330—9)

This invention pertains to a direct-current amplifier for low-level signals and particularly to a direct-current amplifier employing negative feedback.

The ability to improve the linearity and stability of an amplifier by use of negative feedback is demonstrated and described with reference to curves or plots and vector diagrams, in addition to illustrative circuit diagrams, in United States Letters Patent 2,102,671, granted to Harold S. Black on December 21, 1937. In general, providing negative feedback in an amplifier consists of coupling a portion of its output signal $E_o$ to its input terminal, but out of phase with the input signal $E_I$, such that distortions in the signal being amplified are corrected by the portion of the output signal fed back to the input terminal.

If the amplifier gain in the absence of feedback is A, often referred to as the open-loop gain, the output signal $E_o$ is equal to $AE_I$, and if the portion of the output signal fed back is $\beta$, the feedback signal $E_F$ is equal to $\beta E_o$ where $\beta$ is the factor by which the output signal $E_o$ is multiplied to obtain $E_F$ and is a characteristic of the feedback circuit alone. It should be noted that $\beta$ may be a complex quantity, depending on the feedback circuit design, and that A is usually a complex quantity.

The expression for the output signal $E_o$ with the negative feedback circuit connected to the input terminal of the amplifier is:

$$E_o=A(E_I+E_F)$$

By substituting $\beta E_o$ for $E_F$ and solving for $E_o$, the following expression is obtained:

$$E_o=\frac{A}{1-A\beta}E_I$$

Since the closed-loop gain is by definition the ratio $E_o/E_I$, the closed-loop gain is found to be:

$$\frac{E_o}{E_I}=\frac{A}{1-A\beta}$$

If $|A\beta|$ is very large, the closed-loop gain is approximately equal to $$-\frac{1}{\beta}$$

which depends only upon the value of $\beta$.

It is known that phase shifts for at least some component frequencies of a signal through the amplifier and the feedback circuit may be so large as to make the complex quantity $-A\beta$ positive, thereby introducing positive or regenerative feedback which either causes oscillations or assists in sustaining oscillations. However, by controlling the phase shifts in the amplifier and the feedback circuit, a negative feedback amplifier can be provided which will not oscillate under any condition. The criterion for stability which must be met by the design is given by H. Nyquist in an article "Regeneration Theory" published in Bell System Technical Journal (January 1932), vol. 11, page 126. A tutorial article, "The Stability Problem in Feedback Amplifiers" by William A. Lynch on the problem of stability, and Nyquist's criterion as it regards oscillations in a feedback amplifier, may be found in the Proceedings of the I.R.E. (September 1951), vol. 39, No. 9, page 1000.

Nyquist's criterion and its application to the design of a negative feedback amplifier is briefly discussed hereinafter. However, for the complete understanding of the present invention, it is sufficient to know that for all practical purposes an unconditionally stable amplifier can be designed for most any application by controlling the phase shift of a desired range of frequencies in feedback circuits.

The amplifier circuit is defined as the transmission circuit between the input and output terminals of the feedback amplifier having a gain A, and the feedback circuit is defined as the transmission circuit between the output and input terminals of the feedback amplifier having a gain $\beta$. Although the design of each transmission circuit may be considered independently, the transmission through both circuits connected in an open loop must be considered to determine the stability of a feedback amplifier for any given application. The open-loop gain or transmission factor through both circuits is the quantity $|A\beta|$ hereinafter referred to as the feedback factor.

An important application of a negative feedback amplifier is the amplification of low-level, direct-current signals which may be referred to as varying unidirectional signals. Most low-level, direct-current amplifiers include a modulated-carrier-type amplifier circuit in which the low-level, D.-C. input signal effectually modulates an A.-C. carrier signal. The modulated carrier is then amplified, demodulated and filtered to obtain an amplified D.-C. output signal which is proportional to the input signal. The advantage of utilizing a carrier signal is that an A.-C. amplifier circuit may be employed to avoid the problems of D.-C. or zero drifts of direct-coupled amplifiers. An amplifier having a negative feedback circuit is hereinafter referred to as an analog amplifier.

Analog amplifiers are commonly used to amplify low-level signals from transducers, such as strain gauges and thermocouples, in an industrial process monitoring or control system having as many as three hundred or more appropriately placed transducers. Because the cost of precise analog amplifiers is relatively high, it is desirable to employ only one analog amplifier and to connect the various transducers to it sequentially or selectively; but it is often necessary to treat the signals from some transducers differently so that different closed-loop gains must often be provided for signals derived from different transducers.

Accordingly, in the present invention, provision is made for selectively changing the closed-loop gain of an analog amplifier without affecting stability. As noted hereinbefore, the closed-loop gain $A_o$ of an analog amplifier is defined by:

$$A_o=\frac{A}{1-A\beta}$$

Therefore, if $|A\beta|$ is considerably greater than unity, the amplification of the analog amplifier may be expressed as $$-\frac{1}{\beta}$$

which shows that the closed-loop gain of an analog amplifier varies inversely with $\beta$, the transmission (voltage transfer ratio) through the feedback circuit. Consequently, the closed-loop gain of an analog amplifier may be selectively altered by providing a selectively alterable feedback circuit. That is accomplished in one embodiment of the present invention by a relay-controlled, voltage-dividing, resistor network. Since virtually no phase shift occurs in a feedback circuit comprising a resistor network, the closed-loop gain may be selectively altered by altering the feedback transmission $\beta$ without affecting stability if the amplifier is designed to be unconditionally stable according to Nyquist's criterion for stability.

In designing feedback amplifiers, it is customary to (1) determine the frequency response characteristic desired, (2) express the characteristic desired as the feedback factor $A\beta$ in terms of db gain and (3) prepare a plot of $A\beta$ in terms of db gain as a function of frequency on logarithmic scales. Thereafter, to determine whether a particular design proposed is stable, it is only necessary to plot the phase shift of a signal transmitted once around the open feedback loop for all frequencies. Since phase shift varies as the rate with which the amplitude of $A\beta$ varies with frequency, it is possible to plot the general shape of the phase-shift curve directly from the frequency response curve. The exact relationship of the phase shift curve to the frequency response curve is given by the following:

$$\text{Phase shift} = \frac{\pi}{12} \frac{dA\beta}{df}$$

where $dA\beta/df$ is the derivative of $A\beta$ as a function of frequency which can be interpreted geometrically as the slope of the curve. A slope of 12 db per octave corresponds to a phase shift of 180°.

The frequency at which the frequency response curve crosses the locus of $A\beta$ equal to unity is referred to as the gain-crossover frequency, and the frequency at which the phase shift curve crosses the locus of phase shift equal to 180° is referred to as the phase-crossover frequency. If both crossover frequencies are at the same frequency, the design contemplated is considered to be only at the threshold of stability. To assure stability with a margin of safety, the gain-crossover frequency must be adjusted so that $A\beta$ is less than unity at the phase-crossover frequency. That adjustment, however, may only result in a conditionally stable design. To determine whether it is conditionally or unconditionally stable, a Nyquist diagram in polar form may be prepared showing the variation of the feedback factor $A\beta$ and the concomitant phase shift as frequency varies. According to Nyquist's criterion, if the resulting $A\beta$ curve does not enclose the point 1,0 (which represents the point at which the phase shift equals 180° and $A\beta$ is equal to unity), the feedback amplifier is stable. However, if the shape of the curve is such that whether the point 1,0 is enclosed depends upon whether $\beta$ (as a factor independent of frequency) is increased or decreased, then the amplifier is said to be conditionally stable. For a more complete discussion of conditions required for stability in a feedback amplifier and how to satisfy those conditions, one skilled in the art may refer to Chaper 11 of Electronic and Radio Engineering, 4th ed., McGraw-Hill Book Co., 1955, by Fredrick E. Terman.

In order to be able to alter the closed-loop gain of an analog amplifier selectively in accordance with the invention by selectively altering the feedback circuit transmission $\beta$, the amplifier circuit is designed in one embodiment to assure that the maximum phase shift in the amplifier circuit is about 90° so that the feedback factor $A\beta$ may be varied by varying $\beta$ without ever enclosing the point 1,0 in the Nyquist diagram. In that manner, the analog amplifier is designed to be unconditionally stable and $\beta$, which does not vary with frequency, may be selectively altered over any desired range. However, a conditionally stable design may be employed if a sufficient margin of stability is provided for a limited range over which the feedback transmission $\beta$ is to be varied.

In the embodiment of the invention illustrated in the drawings and described hereinafter, the analog amplifier is designed to provide a constant feedback factor $A\beta$ for frequencies from zero to about .008 cycle per second and a constant rate of decrease in $A\beta$ of 6 db per octave from about .008 cycle per second to 80 cycles per second and above so that the gain-crossover frequency occurs at about 80 cycles per second and the phase shift at the gain crossover frequency is a maximum of 90°. Then, in accordance with the principles of the invention, the closed-loop gain $$\frac{A}{1-A\beta}$$

may be selectively decreased by increasing the feedback transmission $\beta$. Since the feedback circuit comprises a resistance network, $\beta$ is independent of frequency and the maximum phase shift in the negative feedback signal for frequencies above approximately .008 cycle per second is not altered as the feedback factor is increased, as noted hereinbefore. However, the gain-crossover frequency is increased to a frequency almost equal to or substantially greater than the carrier frequency as the magnitude of $A\beta$ is selectively increased.

It is recognized by those skilled in the art of designing modulated-carrier-type amplifiers that input signal frequencies must be restricted to a range considerably below the carrier frequency. Accordingly, if an amplifier of the modulated-carrier type is employed in an analog amplifier, the high-frequency components of the feedback signal $E_F$ must be suppressed. That is accomplished by designing the analog amplifier to have a gain-crossover frequency well below the carrier frequency. When the feedback factor $A\beta$ is selectively increased by increasing the feedback transmission $\beta$ to decrease the loop gain, the frequency response curve is displaced as $\beta$ is increased, although the shape of the frequency response curve is not altered, because the feedback transmission $\beta$ is independent of frequency. Consequently, the stability of the analog amplifier is not thereby changed, but the gain-crossover frequency is substantially increased. In order to maintain a constant gain-crossover frequency as the closed-loop gain is selectively increased, it is desirable to make some compensating alteration in the implifier circuit for each change in the closed-loop gain without affecting the maximum phase shift therein.

Accordingly, an object of the invention is to provide a means for automatically altering the amplifier circuit of an analog amplifier for each of a plurality of selective closed-loop gains, without affecting the maximum feedback signal phase shift, to obtain a constant gain-crossover frequency. In order to increase the feedback transmission $\beta$ and maintain substantially the phase shift and gain-crossover frequency as $\beta$ is increased, the corner frequency (which is defined as that frequency at which the feedback factor $A\beta$ is 70.7 percent of its maximum value) must be lowered sufficiently to allow that portion of the frequency-response curve having a constant slope to coincide with the original frequency-response curve.

Since the feedback circuit comprises a voltage-dividing network of resistors so that $\beta$ is independent of frequency, the compensating alteration required to maintain a constant gain-crossover frequency as $\beta$ is increased must be made in the amplifier circuit which includes a modulator, demodulator and filter. That may be accomplished by providing a reactance network in the filter which may be automatically altered as the voltage-dividing network in the feedback circuit is altered. The voltage-dividing network is provided with $n$ resistors which may be selectively switched in parallel with a voltage-dividing resistor to provide $n^2$ distinct voltage dividing ratios. It would be possible to provide $n^2$ reactance elements, one for each of the selective $n^2$ voltage-dividing ratios, each reactance element being substituted in the filter circuit as its corresponding gain setting is selected, but it would be preferable to employ only one reactance element for each of $n$ selective resistors, and to employ them in such a manner that as the $n$ resistors are switched in parallel with a resistor in the voltage-dividing network to provide $n^2$ voltage-dividing ratios, the $n$ reactance elements are also combined in $n^2$ different combinations to adjust the corner-frequency for each one of $n^2$ selective loop gains provided.

Accordingly, another object of the invention is to provide a means for selecting one of $n^2$ loop gains in an analog amplifier utilizing only $n$ resistor elements and to provide a corresponding corner-frequency adjustment for each of the $n^2$ loop gains utilizing only $n$ reactance elements.

Still another problem encountered in direct-current amplifiers used to amplify low-level analog signals is providing a precision zero-offset correction signal to compensate for inherent zero-offset errors in the transducers, particularly when the same amplifier is to be employed with different transducers, each having a different zero-offset error. Accordingly, another object is to provide selective zero-offset correction in an analog amplifier.

A further object is to provide an improved analog amplifier comprising a low-level, direct-current amplifier with negative feedback which will accept floating input signals and produce an amplified output signal which is referenced to a common source of reference potential (ground).

These and other objects of this invention may be realized by providing in the feedback circuit of an analog amplifier a voltage-dividing resistor network including a plurality of relay-controlled resistors which may be selectively switched from a parallel connection with one of two voltage-dividing resistors across which the feedback signal is derived to a parallel connection with the other of the two voltage-dividing resistors which is series connected in the feedback circuit such that the feedback signal is given by the following equation:

$$E_f = E_o R_e \sum_{i=1}^{n} \frac{1}{R_i}$$

where $E_o$ is the analog amplifier output signal; $R_e$ is the equivalent output impedance of the feedback circuit when its input voltage (the output voltage $E_o$) is reduced to zero (short circuit); and $$\sum_{i=1}^{n} \frac{1}{R_i}$$

is the admittance of the paralleled resistors $R_1, R_2 \ldots R_n$ connected in the feedback circuit in series. Since the equivalent output resistance $R_e$ remains constant as the admittance of the paralleled resistors $R_1, R_2 \ldots R_n$ is selectively altered to select a loop gain for the analog amplifier, the feedback signal $E_F$ is proportional to the sum of the admittance $1/R_1, 1/R_2 \ldots 1/R_n$ of the paralleled resistors.

A group of feedback capacitors $C_1, C_2 \ldots C_n$ is provided for the feedback circuit of an operational amplifier in the amplifier circuit. Each capacitor $C_1, C_2 \ldots C_n$ is operatively associated with the respective resistors $R_1, R_2 \ldots R_n$ through the loop-gain selecting relays in such a manner that for each combination of resistors $R_1, R_2 \ldots R_n$ connected in parallel, a corresponding combination of capacitors $C_1, C_2 \ldots C_n$ is connected in parallel in the feedback circuit of the operational amplifier in order to satisfy the following condition:

$$\sum_{i=1}^{n} C_i = K \sum_{i=1}^{n} \frac{1}{R_i}$$

where $$\sum_{i=1}^{n} C_i$$

is the sum of the capacitances of the capacitors $C_1, C_2 \ldots C_n$ connected in parallel; and K is a constant of proportionality. When that condition is satisfied, the gain-crossover frequency $f_{co}$ of the analog amplifier remains constant, a result desired when the amplifier circuit of the analog amplifier includes a modulated-carrier-type amplifier.

To provide selective zero-offset correction, the required zero-offset correction current sources are connected to the feedback circuit. Each current source comprises a pair of substantially equal resistors and a relay for selectively connecting one terminal of one of the two resistors. The other terminal of one of the resistors is connected to a source of reference potential, and of the other resistor to a voltage source of such amplitude as to provide the desired zero-offset correction current. One or the other of the two resistors is always connected to the feedback circuit so that, since the two resistors are substantially equal, the equivalent resistance $R_e$ of the feedback circuit always remains substantially the same.

In order that the analog amplifier may receive floating input signals, provide a referenced output signal and utilize overall negative feedback for precise amplification, the feedback circuit is coupled to the input terminals of the analog amplifiers by a D.-C. transformer comprising a capacitor which is alternately charged by the feedback signal and discharged into the storage capacitor connected to the input circuit of the analog amplifier. A double-pole, double-throw relay switch alternately connects the transforming capacitor to the feedback circuit and the storage capacitor.

Although features of the invention to be protected are pointed out in the appended claims, an illustrative embodiment of the invention together with its further objects and advantages is described by reference to the drawings in which:

Figures 1, 2:
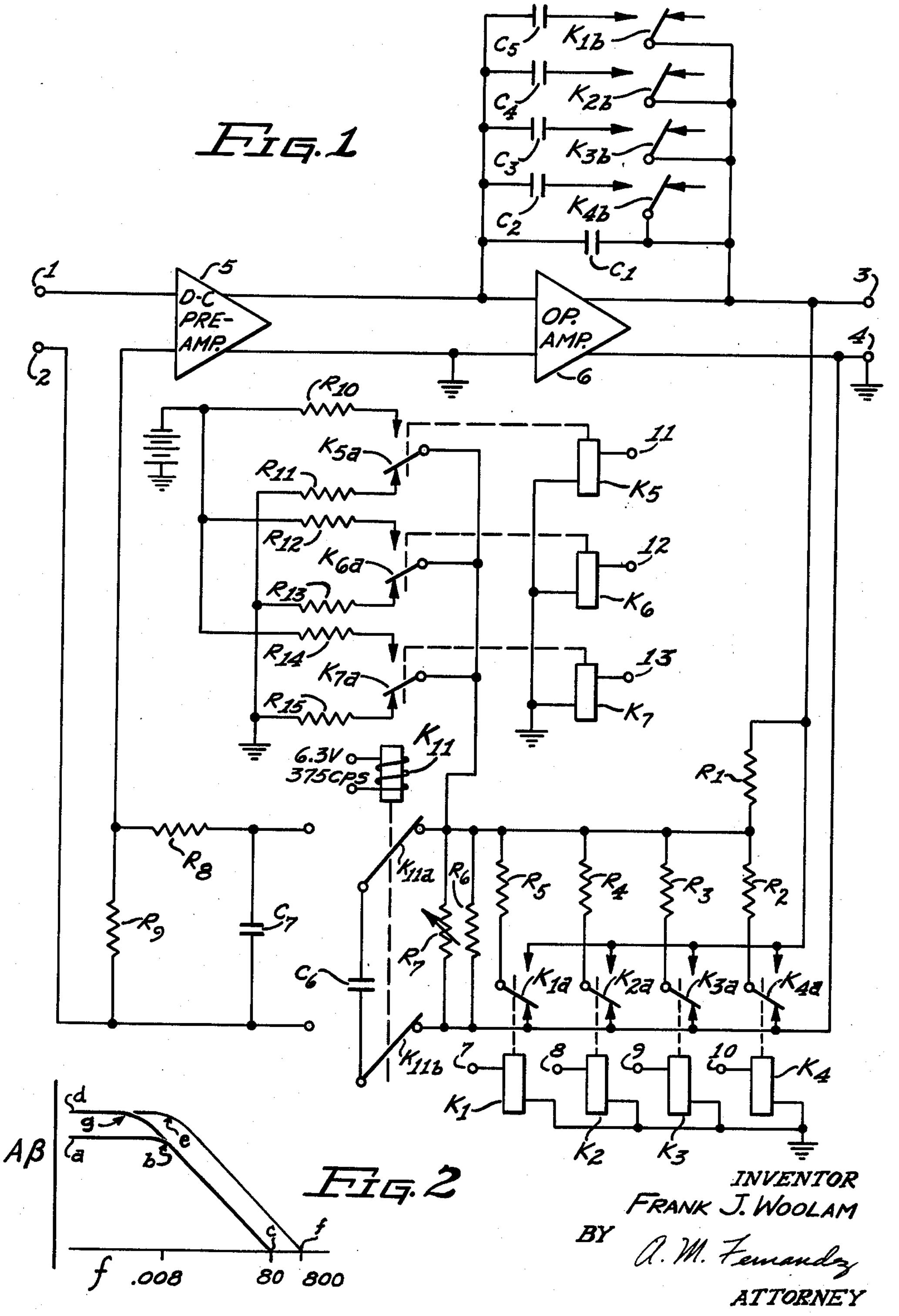
FIG. 1 illustrates a schematic diagram of the invention.
FIG. 2 illustrates frequency-response curves which assist in pointing out the objects and advantages of the invention.

An analog amplifier embodying the features of the invention described hereinbefore, as illustrated in FIG. 1, includes an amplifier circuit connected between input terminals 1 and 2 and output terminals 3 and 4. It should be noted that the output terminal 4 is connected to a point of fixed reference potential, such as ground, whereas the input terminal 2 is not, so that, although a D.-C. preamplifier 5 and an operational amplifier 6 connected in cascade in the amplifier circuit are referenced to a point of reference potential (ground), the input circuit of the D.-C. preamplifier 5, including the input terminals 1 and 2 and a resistor $R_9$, is not referenced to ground.

The analog amplifier also includes a selective feedback circuit comprising resistors $R_1$ to $R_7$, a D.-C. transforming capacitor $C_6$, a voltage-dividing resistor $R_8$ and a storage capacitor $C_7$. The resistor $R_8$ functions with the resistor $R_9$ as a voltage-dividing circuit to enable the selective feedback circuit $R_1$ to $R_7$ to be operated at a higher voltage for charging the transforming capacitor $C_6$ than is required for stabilizing the amplifier circuit.

The transforming capacitor $C_6$ is alternately connected to the selective feedback resistor network $R_1$ to $R_7$ and the storage capacitor $C_7$ in response to actuation of a relay $K_{11}$ by an arbitrarily selected A.-C. signal; a 6.3 volt signal at 375 cycles per second is selected only because in a preferred embodiment it is provided for another independent purpose described with reference to FIG. 3. The relay $K_{11}$ is a double-pole, double-throw switch having one pair of terminals connected to the selective feedback resistor network and the other pair of terminals connected to the storage capacitor $C_7$ so that as the transfer contacts $K_{11a}$ and $K_{11b}$ are switched, the transforming capacitor $C_6$ alternately charges to the feedback signal voltage $E_F$ and discharges into the storage capacitor $C_7$.

The transforming capacitor $C_6$ is selected to provide a relatively short RC time constant for charging and the capacitor $C_7$ is selected to provide a relatively large RC time constant for discharging through the resistors $R_8$ and $R_9$. It should be appreciated that the dwell time of the transfer contacts $K_{11a}$ and $K_{11b}$ at the two pair of terminals is for a period greater than 180° of an actuating cycle and that the dwell time is substantially divided between the two pair of terminals to allow appropriate time for charging the transforming capacitor $C_6$ and discharging it into the storage capacitor $C_7$.

The desired loop gain for the analog amplifier is provided by selectively energizing relays $K_1$ to $K_4$ in response to digital signals applied to terminals 7 to 10. The analog amplifier is designed for the maximum gain desired when all of the relays $K_1$ to $K_4$ are de-energized and the resistors $R_2$ through $R_7$ are in parallel to form a voltage-dividing network with the resistor $R_1$. The resistor $R_7$ is a potentiometer adjusted to provide the precise maximum gain desired.

The combined resistance of the two resistors $R_6$ and $R_7$ in parallel is selected to be very low relative to the resistor $R_1$. For instance, with a resistance of 10K ohms for the resistor $R_1$, the resistors $R_6$ and $R_7$ provide a resistance to ground of about 100 ohms. The remaining resistors $R_2$ and $R_5$ are selected to have relatively large resistance such as 1.25K to 10K ohms so that as they are selectively connected in parallel with the resistor $R_1$ in response to energization of associated relays $K_1$ to $K_4$, the voltage-dividing ratio of the network is selectively altered to provide a larger feedback signal $E_F$ to the transferring capacitor $C_6$, thereby selectively reducing the closed-loop gain of the analog amplifier. For instance, if the resistors $R_1$ and $R_2$ are both selected to be 10K ohms, when the relay $K_4$ is energized and the resistor $R_2$ is placed in parallel with the resistor $R_1$, the resistance between the output terminal 3 and the parallel-connected resistors $R_3$ to $R_7$ is decreased to 5K ohms, the feedback signal $E_F$ is increased by a factor of two and the output signal $E_o$ is decreased by a factor of two. The remaining resistors $R_3$ to $R_5$ could also be selected to be 10K ohms, but in a preferred embodiment of the invention, the remaining resistors $R_3$ to $R_5$ have respective resistances of 5K, 2.5K and 1.25K ohms. The advantage of weighting the resistors in that manner is that binary-coded digital signals may be employed to energize the relays $K_1$ to $K_4$ in sixteen different combinations, thereby providing sixteen distinct gain selections utilizing only four resistors $R_2$ to $R_5$. In more general terms, $n^2$ distinct loop gains may be selected actuating only $n$ switching elements.

The amplifier circuit is designed to have a frequency-response characteristic represented by the curve *a, b* and *c* in FIG. 2 such that the absolute value of the feedback factor $A\beta$ is constant and has a slope of zero for frequencies below approximately .008 cycle per second and is substantially constant with a negative slope of one from about .008 cycle per second to 80 cycles per second and higher frequencies. At 80 cycles per second, the feedback factor is equal to one. That frequency is by definition the gain-crossover frequency. Since the negative slope from *b* to *c* is equal to one, the maximum phase shift of the feedback signal through the open loop is equal to 90 degrees.

When the loop gain is selectively decreased by selectively increasing the feedback factor $A\beta$, an appropriate combination of relays $K_1$ to $K_4$ are energized. For instance, assuming that the closed-loop gain is to be reduced by a factor of two, the relay $K_4$ is energized by a voltage signal representing a binary digit 1 and the resistor $R_2$ is switched in parallel with the resistor $R_1$ to increase the feedback transmission $\beta$ which increases the feedback factor $A\beta$. Since the feedback circuit comprising the voltage-dividing network of resistors has no effect on the phase shift through the open-loop circuit, the frequency-response curve represented by the curve *d, e* and *f* in FIG. 2 results from increasing the feedback factor $A\beta$.

It should be noted that the frequency-response curve for the increased feedback factor has a negative slope of one for frequencies higher than .008 cycle per second and that it intercepts the locus of $A\beta$ equal to one at a higher frequency illustrated as being approximately 800 cycles per second. Consequently, although the maximum phase shift through the open-loop circuit remains constant at 90° and the analog amplifier remains stable in accordance with Nyquist's criterion for stability, the gain-crossover frequency is considerably increased by a factor of approximately ten.

In the preferred embodiment of the invention the D.-C. preamplifier 5 is a low-level differential amplifier of the modulated-carrier type which effectually employs a carrier frequency of 375 cycles per second as more fully described with reference to FIG. 3.

The current output of the D.-C. preamplifier 5 drives an integrating amplifier comprising the operational amplifier 6 and negative feedback capacitor $C_1$ in combination with selected ones of four other capacitors $C_2$ to $C_5$. The function of the integrating amplifier is primarily that of providing an ideal filter for the D.-C. preamplifier so that the signal at the output terminals 3 and 4 is a D.-C. signal. Its secondary function is that of controlling the frequency-response characteristic of the analog amplifier. For example, with all of the relays $K_1$ to $K_4$ de-energized, only the capacitor $C_1$ provides negative feedback for the operational amplifier 6. Under those conditions the loop gain is a minimum of $10^4$ and the gain-crossover frequency is approximately 80 cycles per second. In order to have a gain-crossover frequency of 80 cycles per second and a negative slope of one for a maximum phase shift of 90 degrees, the open-loop gain characteristic curve must start to drop at approximately .008 cycle per second as shown by curve *a, b* and *c* in FIG. 2. Such a frequency-response characteristic provided by the integrating amplifier is virtually impossible to achieve with only passive network components.

If the loop gain is decreased by increasing the feedback factor $A\beta$, the frequency-response curve *d, e* and *f* shown in FIG. 2 is obtained and the gain-crossover frequency is increased to about 800 cycles per second unless the feedback capacitance of the integrating amplifier is appropriately changed. Since a modulated-carrier type of preamplifier is employed, a gain-crossover frequency substantially below the carrier frequency of 375 cycles per second should be maintained in order to avoid nulls and phase shifts in the D.-C. preamplifier which otherwise occur if the rate of change of information in the negative feedback signal is allowed to approach the carrier frequency. Consequently, to avoid nulls and phase shifts in the D.-C. preamplifier, the corner frequency in the response curve for the feedback signal which provides the decreased loop gain must be decreased until the gain-crossover frequency again occurs at 80 cycles per second. As noted hereinbefore, the corner frequency is defined as that frequency at which the frequency response is down 3 db or down to 70.7 percent of the maximum response. In the illustrative embodiment of the present invention, that is accomplished by providing a compensating capacitor for each gain-selecting resistor. For instance, when the relay $K_4$ is energized and the resistor $R_2$ is connected in parallel with the resistor $R_1$ to decrease loop gain by a factor of two, thereby shifting the frequency response to the curve *d, e* and *f* in FIG. 2, the capacitor $C_2$ is automatically connected in parallel with the capacitor $C_1$ to decrease the corner frequency, thereby shifting the frequency-response curve *d, e* and *f* to the curve *d, g* and *c* as illustrated in FIG. 2. The value of capacitance required for the capacitor $C_2$ to accomplish that is predetermined. The value of the remaining capacitors $C_3$ to $C_5$ associated with the remaining resistors $R_3$ to $R_5$ are similarly predetermined by individually energizing the respective relays $K_1$ to $K_3$ and determining the value of capacitance which must be added to the feedback capacitor $C_1$ to provide a frequency-response curve having a gain-crossover frequency of approximately 80 cycles per second for each gain-selecting resistor $R_3$, $R_4$, and $R_5$. If more gain-selecting resistors are added for a greater range of selective loop gains, additional compensating capacitors should be added.

As noted hereinbefore, the relays $K_1$ to $K_4$ may be energized individually or in combination to provide sixteen distinct selective loop gains. Since the transfer contacts $K_{1b}$ to $K_{4b}$ are mechanically linked to the transfer contacts $K_{1a}$ to $K_{4a}$ as a given one of the sixteen possible loop gains is selected by placing the appropriate ones of the resistors $R_2$ to $R_5$ in parallel with the resistor $R_1$, either individually or in combination, the associated capacitors $C_2$ to $C_5$ are simultaneously placed in parallel with the capacitor $C_1$. In that manner, a compensating adjustment of the corner frequency is automatically provided to maintain the gain-crossover frequency at approximately 80 cycles per second for any loop gain selected.

The novel arrangement of the voltage-dividing network of resistors for selective loop gain with the associated compensating capacitors for maintaining a constant gain-crossover frequency has the advantage of requiring only one compensating capacitor for each gain-selecting resistor. As noted hereinbefore, a further advantage in that arrangement is that as the gain-selecting resistors $R_2$ to $R_5$ are connected in parallel with the voltage-dividing resistor $R_1$, either individually or in combination, the corresponding capacitors $C_2$ to $C_5$ are connected in parallel with the capacitor $C_1$ to provide the proper compensation for a constant gain-crossover frequency regardless of the combination of gain-selecting resistors $R_2$ to $R_5$ connected in parallel with the resistor $R_1$.

The reason the capacitors $C_2$ to $C_5$ may be connected in parallel with $C_1$ in different combinations to provide the proper compensation for a constant gain-crossover frequency may be explained in the following manner. But first the criterion for a constant gain-crossover frequency $f_{co}$ must be developed from the definition of a gain-crossover frequency $f_{co}$, that definition being the frequency for which the absolute value of the feedback factor $A\beta$ is one.

The amplifier gain without feedback, referred to hereinbefore as the open-loop gain A, is equal to the product of the gain $G_1$ of the preamplifier and the gain $G_2$ of the integrating amplifier so that the open loop gain or feedback factor may be determined from the following equation:

$$|A\beta| = |G_1 G_2 \beta|$$

where:

$$G_2 = \frac{D_o}{z_1}$$

and $$\frac{D_o}{z_1} = X_c = \frac{1}{2\pi FC}$$

$D_o$ is the output voltage signal from the integrating amplifier; $z_1$ is the input current to the integrating amplifier; $G_2$ is the gain of the operational amplifier 6; and C is the feedback capacitance of the integrating amplifier. From that, the following equation may be written for a feedback factor $A\beta$ equal to one:

$$1 = G_1\beta\left[\frac{1}{2\pi f_{co} C}\right]$$

Solving for $f_{co}$, it is seen that $$f_{co} = \frac{G_1}{2\pi}\frac{\beta}{C} = K\frac{\beta}{C}$$

from which it can be seen that if $f_{co}$ is to remain constant as the feedback transmission $\beta$ is increased, the ratio $\beta/C$ must be maintained constant.

The equation $$G_2 = \frac{D_o}{z_1}$$

is not in conflict with Ohm's law since the equation is for the gain of the operational amplifier as defined by the applicant to be voltage signal $D_o$ over the input current $z_1$. The gain of an amplifier is usually defined as the ratio of the voltage signal out to the voltage signal in; however, in this instance it is more convenient to define the gain of the integrating amplifier in the manner indicated, so that the equation in column 9, line 62, may be derived in a straightforward manner to establish the relationship between $\beta$ and the feedback capacitance C of the integrating amplifier.

It may be seen with reference to FIG. 1 that $\beta$ is increased by increasing the conductance through the series resistance connected between the output terminal 3 and the parallel resistors $R_6$ and $R_7$, and that the conductance may be increased by switching additional ones of the resistors $R_2$ to $R_5$ in parallel with the series resistor $R_1$. Therefore, it may be generally understood that the compensating capacitance should also be increased to maintain the ratio $\beta/C$ constant for a constant gain-crossover frequency $f_{co}$ by adding corresponding compensating capacitors to the fixed capacitor $C_1$. The specific relationship between the conductance in the feedback circuit and the feedback capacitance in the integrating amplifier may be derived by first observing that in accordance with Norton's theorem of circuit analysis, the equivalent output impedance $R_e$ of the feedback circuit is equal to all of the resistors $R_1$ to $R_7$ in parallel and further that when the output terminals of the feedback circuit are connected together to provide a short circuit across the resistors $R_2$ to $R_7$, the short-circuit current $I_s$ is $D_o/R_1$. Resistors $R_{11}$, $R_{13}$, and $R_{15}$ in a zero-offset compensating circuit may be ignored since they offset the equivalent output impedance $R_e$ only by a constant and do not affect the short-circuit current $I_s$.

As relays $K_1$ to $K_4$ are energized, associated resistors $R_2$ to $R_5$ are connected in parallel with $R_1$, instead of in parallel with $R_6$ and $R_7$, and the short-circuit current is increased for each resistor so connected in parallel with $R_1$ by an amount equal to $D_o/R_i$, where $R_i$ is the resistance of a given one of the resistors $R_2$ to $R_5$. A general expression for the short-circuit current is $$I_s = D_o \sum_{i=1}^{n} \frac{1}{R_i}$$

and the equation for the feedback signal is $$E_F = I_s R_e$$

By substituting the general expression for $I_s$ in the equation for the feedback signal $E_F$, the following equation is derived:

$$E_F = D_o R_e \sum_{i=1}^{n} \frac{1}{R_i}$$

Since $\beta$ is by definition equal to $E_F/D_o$, it is seen that $$\beta = R_e \sum_{i=1}^{n} \frac{1}{R_i}$$

Since $R_e$ remains constant, the resulting equation for $\beta$ may be written as $$\beta = K \sum_{i=1}^{n} \frac{1}{R_i}$$

It is again noted for emphasis that $n$ represents the numerical subscript of each resistor which contributes to the conductance of the resistors in series between the output terminal 3 and the transfer contact $K_{11a}$.

As noted hereinbefore, the criterion for a constant gain-crossover frequency is that $\beta/C$ remain constant. By substituting for $\beta$ the quantity $$K \sum_{i=1}^{n} \frac{1}{R_i}$$

and for C the quantity $$\sum_{i=1}^{n} C_i$$

where $C_i$ represents the paralleled ones of the capacitors $C_1$ to $C_5$ associated with the resistors $R_1$ to $R_5$ which are connected in parallel, a general expression for the criterion for a constant gain-crossover frequency may be written as follows:

$$f_{co}=\frac{K\sum_{i=1}^{n}\frac{1}{R_i}}{\sum_{i=1}^{n}C_i}$$

From that equation it may be seen that if $f_{co}$ is to be constant, the following equality must be maintained:

$$\sum_{i=1}^{n}C_i=K\sum_{i=1}^{n}\frac{1}{R_i}$$

where K is a constant of proportionality. Thus it can be seen that having provided an appropriate capacitance to be connected in parallel with the capacitor $C_1$ for each individual resistor $R_2$ to $R_4$ to be connected in parallel with the resistor $R_1$, the resistors $R_2$ to $R_4$ may be connected in parallel with the resistor $R_1$ in sixteen distinct combinations and the gain-crossover frequency is maintained constant by the corresponding capacitors $C_2$ to $C_4$ which are automatically connected in parallel with the capacitor $C_1$.

It is often desirable to introduce a zero-offset correction signal in an operational amplifier. That is accomplished according to the present invention by providing a plurality of current sources which can be selectively connected to the feedback circuit in response to selective actuation of an appropriate one of the plurality of relays $K_5$ to $K_7$. Relays $K_5$ to $K_7$ are actuated by signals applied to terminals 11–13, respectively, by such selective devices as pushbuttons which are not shown. The current source associated with each relay consists of two resistors, one being connected to a source of reference potential (ground) and the other being connected to a source of potential of the same polarity as the negative feedback signal. For instance, associated with the relay $K_5$ are two resistors $R_{10}$ and $R_{11}$. When the relay $K_5$ is de-energized, the relay transfer contact $K_{5a}$ connects the resistor $R_{11}$ in parallel with resistors $R_6$ and $R_7$, as shown, so that no zero-offset correction current is introduced into the feedback circuit. But when a signal at an input terminal 11 energizes the relay $K_5$, the transfer contact $K_{5a}$ connects the resistor $R_{10}$ to the junction between the resistor $R_1$ and the resistors $R_6$ and $R_7$, thereby introducing a zero-offset correction signal to correct the output signal $E_0$ at the output terminals 3 and 4 for any zero-offset error.

As noted hereinbefore, the resistor $R_1$ is selected to be large (approximately 10K ohms) relative to the resistors $R_6$ and $R_7$ in parallel which provide approximately 100 ohms of resistance. The resistors $R_{10}$ and $R_{11}$ are also selected to be large relative to the resistors $R_6$ and $R_7$, such as 55K to 75K ohms, the exact resistance being determined by the zero-offset correction required. Since the resistor $R_1$ and the resistors $R_{10}$, $R_{12}$ and $R_{14}$ are large relative to the equivalent resistance of resistors $R_6$ and $R_7$, the zero-offset correction signal sources do not appreciably affect the voltage level of the reference potential source (ground) for the feedback signal, and since the resistors associated with each current source are selected to have approximately the same impedance, the equivalent output impedance $R_e$ of the feedback circuit comprising the resistors $R_1$ to $R_7$ is not affected by the energization of zero-offset correction selecting relays $K_5$ to $K_7$. In determining the equivalent resistance $R_e$, it should be noted that the internal impedance of the source of potential B− is very low (approximately 1 ohm); consequently, in determining the output equivalent resistance $R_e$, all of the resistors $R_{10}$, $R_{12}$ and $R_{14}$ may be considered as having one terminal connected to ground.

Figure 3:
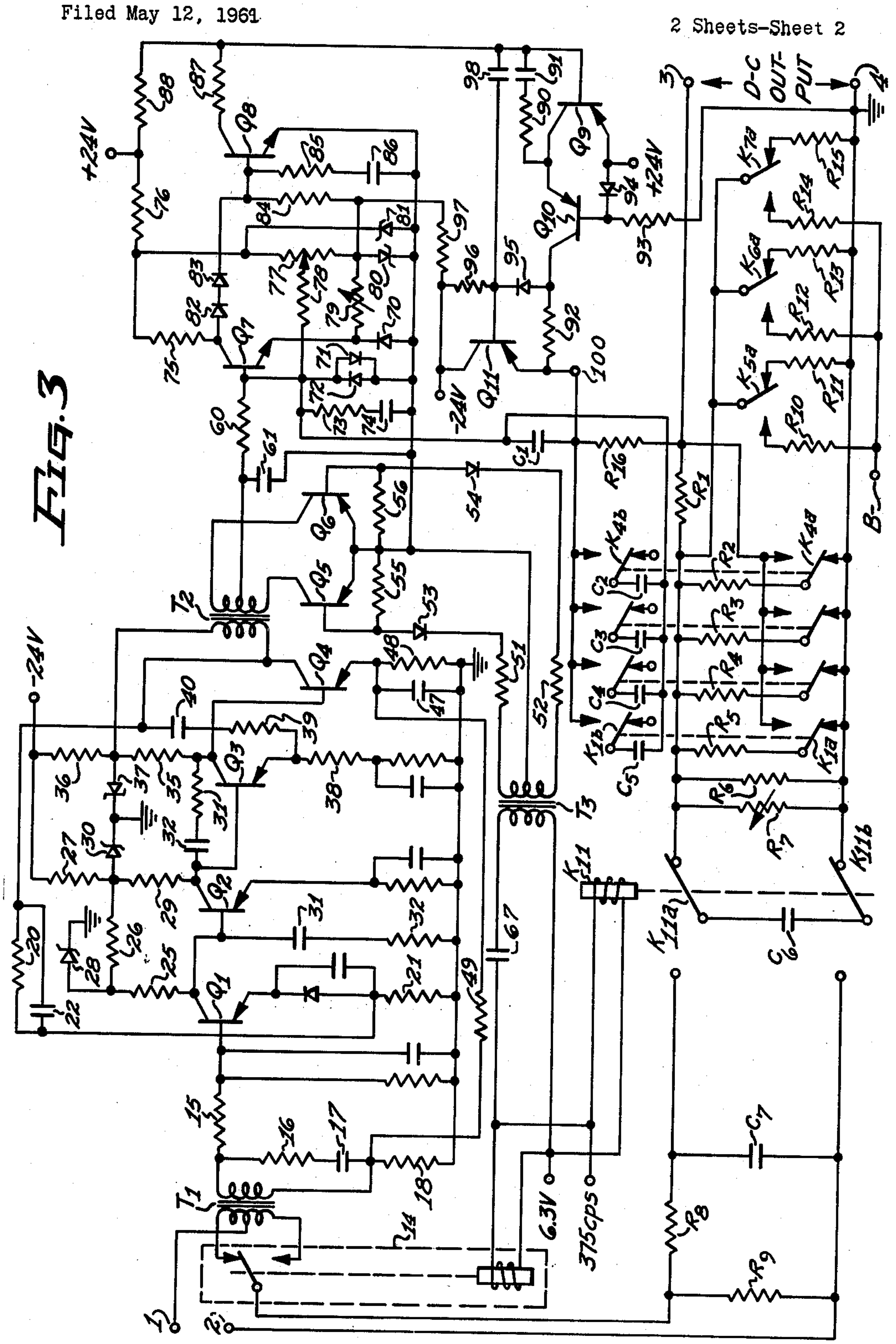
FIG. 3 is a circuit diagram of the embodiment illustrated in FIG. 1.

A circuit diagram of a specific embodiment of the present invention is illustrated in FIG. 3. However, it should be understood that a D.-C. preamplifier and an operational amplifier of other designs may also be utilized in an embodiment of the invention as illustrated in FIG. 1.

The D.-C. preamplifier consists of a synchronous vibrator 14, an input transformer $T_1$, a four-stage, direct-coupled amplifier including transistors $Q_1$ to $Q_4$, an output transformer $T_2$ and a pair of demodulating transistor switches $Q_5$ and $Q_6$. The integrator comprising the operational amplifier having negative feedback capacitors functions primarily as an ideal filter for the D.-C. preamplifier. It includes three common-emitter amplifier stages $Q_7$, $Q_8$ and $Q_9$; a common-base amplifier stage $Q_{10}$; and an emitter-follower output stage $Q_{11}$.

A low-level, direct-current signal source, such as a strain gauge or thermocouple, is connected to the input terminals 1 and 2. The input terminal 2 is connected to the transfer contact of the synchronous vibrator 14 through the resistor $R_9$ and the input terminal 1 is connected to a center tap on a primary winding of the input transformer $T_1$. The two contacts of the synchronous vibrator 14 are connected to opposite ends of the primary winding so that as the synchronous vibrator is excited by a 6.3 volt signal at 375 cycles per second, the D.-C. input signal from the source is modulated into a square wave signal which is coupled by the transformer $T_1$ to the base of transistor $Q_1$, the amplitude of the square wave signal varying with the intensity of the D.-C. input signal to be amplified.

The cascaded amplifier stages comprising the four direct-coupled, common-emitter transistors $Q_1$ to $Q_4$ are employed to provide high gain and good D.-C. stability. A resistor 15 couples the input transformer $T_1$ to the base of the first transistor $Q_1$. A resistor 16 and a capacitor 17 filter high frequencies to prevent ringing in the secondary winding of the transformer $T_1$. A resistor 18 provides bias for the transistor $Q_1$ through the secondary winding of the transformer $T_1$ in response to a feedback signal through a resistor 49 from the emitter of the last transistor $Q_4$. A resistor 20 and a capacitor 22 couples the collector of the transistor $Q_4$ to a negative feedback resistor 21 in the emitter circuit of the first stage to provide high gain stability for signals at 375 cycles per second over all four stages. A Zener diode 28 and resistors 25, 26 and 27 provide a collector bias for the transistor $Q_1$.

The output of the first stage is coupled to the base of the second transistor $Q_2$. A resistor 29 and a Zener diode 30 provide collector bias for the transistor $Q_2$. A capacitor 31 and a resistor 32 provide high-frequency stabilization for the second stage. A Zener diode 37 and two resistors 35 and 36 provide collector bias for the transistor $Q_3$. A resistor 38 in the emitter circuit of the transistor $Q_3$, a resistor 39 and a capacitor 40 provide high-frequency feedback to the third stage from the collector of the fourth transistor $Q_4$ for high gain stability. The collector of the transistor $Q_3$ is directly connected to the base of the last transistor $Q_4$.

A resistor 48 in the emitter circuit of the transistor $Q_4$ and a capacitor 37 provide bias for the last transistor $Q_4$, the output of which is coupled from the collector to a primary winding of the transformer $T_2$.

The demodulator connected to the secondary winding of the transformer $T_2$ consists of two switching transistors $Q_5$ and $Q_6$ which are alternately rendered conductive by the 6.3 volt excitation signal transformer coupled to their base electrodes by a transformer $T_3$, a pair of current-limiting resistors 51, 52 and a pair of blocking diodes 53, 54. Resistors 55 and 56 provide appropriate bias for the transistors $Q_5$ and $Q_6$ to assure that each transistor is rendered conductive only after the excitation signal alternately coupled to it reaches a predetermined amplitude. A demodulated signal is derived from the center tap of the secondary winding of the transformer $T_2$ and applied to a low-pass filter consisting of a resistor 60 and a capacitor 61.

Since the synchronous vibrator 14 is a mechanical device electromagnetically actuated and the demodulator comprising switching transistors $Q_5$ and $Q_6$ is an electronically operated device, the synchronous vibrator necessarily tends to lag behind the demodulator by some phase angle of about 60 degrees. In order to synchronize the demodulator with the synchronous vibrator, an appropriate delay is introduced in the excitation signal applied to the transformer $T_3$ by a phase-shifting circuit comprising the capacitor 67.

The output signal from the output of the D.-C. preamplifier is directly applied to the base electrode of the transistor $Q_7$ which is connected in the grounded-emitter amplifier configuration. In order to minimize drift due to ambient temperature changes, a silicon transistor is employed in the first stage with a silicon diode 70 which compensates for base-to-emitter voltage drift due to temperature changes.

Diodes 82 and 83 couple the collector electrode of the transistor $Q_7$ to the base electrode of the transistor $Q_8$ which is also connected in a grounded-emitter amplifier configuration. The output signal of the second stage derived from a junction between a pair of resistors 87 and 88 serially connected in the collector circuit of the transistor $Q_8$ is directly connected to the base electrode of the transistor $Q_9$ in the third stage which is also connected in the common-emitter amplifier configuration.

The transistor $Q_{10}$ in the fourth stage is connected in a common-base amplifier configuration having the emitter directly connected to the collector of the third stage and the collector coupled to an output terminal 100 by a resistor 92 and, by a diode 95 which provides a low-impedance path, to the base electrode of the output transistor $Q_{11}$ which provides a low output impedance at the output terminal 100.

Three frequency response control networks are employed in the operational amplifier for frequency-response stabilization: resistor 73 and capacitor 74 for response of frequencies from 100 to 1000 c.p.s.; resistor 85 and capacitor 86 for response of frequencies from 1 to 100 c.p.s.; and resistor 90, capacitor 91 and capacitor 98 for response of frequencies greater than 1000 c.p.s.

A potentiometer 77 coupled to the base electrode of the transistor $Q_7$ by a resistor 78 and a potentiometer 79 provide zero adjustment of the operational amplifier by first setting the potentiometer 77 to provide a zero-volt signal to the resistor 78 and then adjusting the potentiometer 79 until the base electrode of the transistor $Q_7$ is at zero volts with respect to the signal reference potential derived from the junction between the resistors 55 and 56 in the demodulator. In that manner, the voltage drop across the diode 70 is made equal to the voltage drop across the base-to-emitter junction of the transistor $Q_7$. The potentiometer 77 is then finally adjusted until the signal at the output terminal 100 is zero volts with respect to ground reference potential. While the foregoing adjustments are being made, the resistor 60 is disconnected from the junction between the center tap of the transformer $T_2$ and the capacitor 61 and directly connected to the output terminal 100 to provide a D.-C. negative feedback signal which tends to maintain the base electrode of the transistor $Q_7$ at zero volts.

During normal operation, the capacitor $C_1$ provides negative feedback from the output terminal 100 to the base electrode of the transistor $Q_7$. As described hereinbefore, the capacitor $C_1$ is selected to provide a gain-crossover frequency of approximately 80 cycles per second for the maximum closed-loop gain of the analog amplifier comprising the D.-C. preamplifier, the integrating operational amplifier and the negative feedback circuit.

In this illustrative circuit, the output signal from the operational amplifier is coupled to the output terminal 3 by a small dropping resistor $R_{16}$ having an impedance of approximately 50 ohms. The reason for providing that resistor is that the relays $K_1$ to $K_4$ are preferably selected to be of the make-before-break-contact type so that the output terminals 3 and 4 are momentarily shorted when a relay is actuated. The resistor $R_{16}$ prevents the output terminal 100 of the operational amplifier from being shorted to ground while the terminals 3 and 4 are momentarily shorted by an actuated relay.

While the principles of the invention have now been made clear in an illustrative embodiment, there will be immediately obvious to those skilled in the art many modifications in structure, arrangement, proportions, the elements, materials, and components, used in the practice of the invention, and otherwise, which are particularly adapted for specific environments and operating requirements, without departing from those principles. The appended claims are therefore intended to cover and embrace any such modifications, within the limits only of the true spirit and scope of the invention.

What is claimed is:

1. An analog amplifier comprising: a high-gain, direct-current amplifying circuit having an output circuit including two output terminals, one of which is connected to a source of reference potental, and an input circuit having two input terminals; a voltage-dividing network including two resistors serially connected between said output terminals for producing a negative feedback signal at a junction between said two resistors; a coupling resistor connected in series between one of said input terminals and said direct-current amplifying circuit; a storage capacitor; direct-current conductive means for connecting said storage capacitor in parallel with said coupling resistor; a transforming capacitor; and a switching means for alternately connecting said transforming capacitor between said junction and said source of reference potential to thereby charge it to the voltage of said negative feedback signal and in parallel with said storage capacitor to thereby charge said storage capacitor, whereby said storage capacitor continually charged by said transforming capacitor and discharged through said coupling resistor provides a negative feedback signal to said direct-current amplifying circuit.

2. An analog amplifier as defined in claim 1 including means connected to said junction of said voltage dividing network for adding a zero-offset correction signal of predetermined amplitude to said negative feedback signal, wherein said means for adding a zero-offset signal to said negative feedback signal is a selective signal source comprising: first and second zero-offset circuit terminals; switching means connecting said first zero-offset circuit terminal to said junction of said voltage-dividing network; a first direct-current conductive impedance element connected between said first zero-offset circuit terminal and said second output terminal of said output circuit; a second direct-current conductive impedance element and a source of direct-current energizing potential serially connected between said second zero-offset circuit terminal and said source of reference potential, the polarity and potential of said source of direct-current energizing potential and the impedance of said second conductive impedance element being selected to provide a predetermined zero-offset signal amplitude when said second zero-offset circuit terminal is connected to said junction; and means for selectively actuating said switching means to disconnect said first zero-offset circuit terminal from said junction and to connect said second zero-offset circuit terminal to said junction, whereby a zero-offset signal of predetermined amplitude is selectively added to said negative feedback signal.

3. An analog amplifier as defined in claim 2 wherein the impedance of said first direct-current conductive impedance element is substantially equal to the impedance of said second direct-current conductive impedance element, whereby the output impedance of said negative-feedback circuit remains substantially constant when said switching means is actuated.

4. An analog amplifier comprising: a high-gain, direct-current amplifying circuit including a D.-C. preamplifier of the modulated carrier-type and an operational amplifier having a negative feedback circuit consisting of a reactance network including a first integrating capacitor connected in series between an output terminal and an input terminal thereof; an over-all negative feedback circuit including first and second voltage-dividing resistors serially connected between said output terminal of said operational amplifier and a source of reference potential, the junction between said first and second serially-connected resistors being coupled to an input circuit of said D.-C. preamplifier; means for selectively altering the voltage-dividing ratio of said voltage-dividing network by varying the feedback transmission between the output terminal of said operational amplifier and said junction while maintaining the direct-current conductive impedance between said junction and said source of reference potential substantially constant; and means for varying the integrating capacitance of said operational amplifier in response to variations in said voltage-dividing network to maintain constant the ratio of the feedback transmission to the integrating capacitance to maintain the frequency response characteristic of said analog amplifier substantially constant for any selected voltage-dividing ratio of said voltage-dividing network over a predetermined range of frequencies, whereby the gain-crossover frequency of said analog amplifier remains substantially constant.

5. An analog amplifier as defined in claim 4 wherein said means for selectively altering the voltage-dividing ratio of said voltage-dividing network comprises a plurality of resistors each having one terminal connected to said junction, a plurality of selectively energizable switching means, one for each of said plurality of resistors, each switching means connecting a second terminal of its associated resistor to said output terminal of said operational amplifier when selectively energized, and wherein said means for varying the integrating capacitance in the feedback circuit of said operational amplifier comprises a plurality of capacitors, one for each resistor, the capacitance of each being selected to provide the compensation required for a constant frequency response characteristic of said analog amplifier over said predetermined range of frequencies when its associated resistor has its second terminal connected to the output terminal of said operational amplifier, and means responsive to the switching means associated with its corresponding resistor for connecting it in parallel with said first integrating capacitor when the associated switching means is energized, whereby the ratio of the feedback transmission to the integrating capacitance between the output terminal of said operational amplifier and said junction is maintained constant as said plurality of switching means are selectively energized either individually or in combination.

6. An analog amplifier as defined in claim 5 including a zero-offset, error-correcting means connected to said junction for inserting a direct-current, zero-offset signal into said negative feedback circuit, whereby the negative feedback signal derived from said voltage-dividing network is altered in amplitude to correct the amplitude of an output signal of said analog amplifier for a zero-offset error.

7. In an analog amplifier consisting of a high-gain, direct-current amplifying circuit having an input circuit including first and second input terminals, an output circuit including first and second output terminals, means for connecting a direct-current signal source to said first and second input terminals, means for connecting a utilization circuit to said first and second output terminals, and a digitally controlled negative feedback circuit coupling said output circuit to said input circuit in order to improve the linearity and stability of said amplifying circuit and to provide a selective negative feedback factor for said analog amplifier, said negative feedback circuit comprising: first and second voltage-dividing resistors serially connected between said first and second output terminals; a coupling resistor in said input circuit serially connected between said second input terminal and said amplifying circuit; a storage capacitor; direct-current conductive means for connecting said storage capacitor in parallel with said coupling resistor; a transforming capacitor; means for alternately connecting said transforming capacitor in parallel with said second voltage-dividing resistor and in parallel with said storage capacitor, whereby a direct-current negative feedback signal derived from a voltage drop across said second voltage-dividing resistor is coupled to said input circuit without providing a direct-current path from the output circuit of said amplifying circuit through said negative feedback circuit; a plurality of feedback selecting switches; a plurality of feedback selecting resistors, each having a first terminal connected to a junction between said first and second voltage-dividing resistors and a second terminal coupled to said second output terminal by an associated one of said feedback selecting switches, each of said feedback selecting switches including means for uncoupling the second terminal of its associated feedback selecting resistor from said second output terminal and coupling it to said first output terminal upon being actuated; and digital control means for selectively actuating said feedback selecting switches.

References Cited in the file of this patent

UNITED STATES PATENTS

| | | |
|---|---|---|
| 2,397,625 | Roche et al. | Apr. 2, 1946 |
| 2,936,423 | Berry | May 10, 1960 |
| 2,946,943 | Nye et al. | July 26, 1960 |
| 3,007,116 | Gerhard | Oct. 31, 1961 |
| 3,011,132 | Hinrichs et al. | Nov. 28, 1961 |
| 3,082,381 | Morrill et al. | Mar. 19, 1963 |